(12) United States Patent
Zhou

(10) Patent No.: US 9,030,967 B2
(45) Date of Patent: May 12, 2015

(54) RAPID CONVERGENCE OF ACCESS NETWORK

(71) Applicant: Hangzhou H3C Technologies Co., Ltd., Hangzhou, Zhejiang (CN)

(72) Inventor: Wan Zhou, Beijing (CN)

(73) Assignee: Hangzhou H3C Technologies Co., Ltd., Zhejiang (CN)

( * ) Notice: Subject to any disclaimer, the term of this patent is extended or adjusted under 35 U.S.C. 154(b) by 0 days.

(21) Appl. No.: 14/373,888

(22) PCT Filed: Jul. 4, 2013

(86) PCT No.: PCT/CN2013/078780
§ 371 (c)(1),
(2) Date: Jul. 22, 2014

(87) PCT Pub. No.: WO2014/012433
PCT Pub. Date: Jan. 23, 2014

(65) Prior Publication Data
US 2015/0049645 A1   Feb. 19, 2015

(30) Foreign Application Priority Data
Jul. 19, 2012 (CN) .......................... 2012 1 0250280

(51) Int. Cl.
*H04L 12/28* (2006.01)
*H04L 12/923* (2013.01)
(Continued)

(52) U.S. Cl.
CPC .......... *H04L 47/762* (2013.01); *H04L 12/4641* (2013.01); *H04L 12/4675* (2013.01); *H04L 41/082* (2013.01)

(58) Field of Classification Search
CPC .............. H04L 47/762; H04L 12/4641; H04L 12/4675; H04L 41/082
See application file for complete search history.

(56) References Cited

U.S. PATENT DOCUMENTS

2003/0198221 A1* 10/2003 Kim et al. ..................... 370/389
2008/0089305 A1   4/2008 Yao et al.
(Continued)

FOREIGN PATENT DOCUMENTS

| CN | 102136917 | 7/2011 |
| CN | 102752183 | 10/2012 |

OTHER PUBLICATIONS

International Search Report and Written Opinion dated Oct. 3, 2013 issued on PCT Patent Application No. PCT/CN2013/078780 dated Jul. 4, 2013, The State Intellectual Property Office. P.R. China.

*Primary Examiner* — Clemence Han
(74) *Attorney, Agent, or Firm* — Mannava & Kang, P.C.

(57) ABSTRACT

The present disclosure describes rapid convergence of an Access Network (AN). A VLAN forwarder is allocated to a first Virtual Local Area Network (VLAN) and traffic for the first VLAN is forwarded to and from the AN via the VLAN forwarder. When detecting that the VLAN forwarder satisfies a VLAN reallocation condition, the VLAN forwarder blocks traffic of the first VLAN to and from the AN via the VLAN forwarder, and calculates a characteristic value of the VLAN forwarder. A packet carrying the characteristic value of the VLAN forwarder is transmitted to each neighbor VLAN forwarder such that VLAN reallocation is performed by a VLAN allocator if the characteristic value of the VLAN forwarder is the same as that of each neighbor VLAN forwarder. After receiving information that the VLAN forwarder is reallocated to a second VLAN, the VLAN forwarder allows the traffic of the second VLAN to and from the AN via the VLAN forwarder.

15 Claims, 5 Drawing Sheets

(51) Int. Cl.
   *H04L 12/46*      (2006.01)
   *H04L 12/24*      (2006.01)

(56) References Cited

U.S. PATENT DOCUMENTS

2009/0037607 A1* 2/2009 Farinacci et al. ............. 709/249
2010/0220731 A1   9/2010 Diab et al.
2013/0021942 A1* 1/2013 Bacthu et al. ................ 370/254
2013/0089093 A1* 4/2013 Bacthu et al. ................ 370/390
2013/0100851 A1* 4/2013 Bacthu et al. ................ 370/254
2013/0235876 A1* 9/2013 Sajassi et al. ................ 370/401
2013/0315090 A1* 11/2013 Mentze et al. ................ 370/252
2014/0043972 A1* 2/2014 Li et al. ........................ 370/230

* cited by examiner

RAPID CONVERGENCE OF ACCESS NETWORK

CROSS-REFERENCE TO RELATED APPLICATION

The present application is a 371 application of International Application No. PCT/CN2013/078780 filed on Jul. 4, 2013 and entitled "Rapid Convergence of Access Network," which claims benefit of Chinese Patent App. No. CN 201210250280.2 filed on Jul. 19, 2012.

BACKGROUND

A transport network (also known as a provider network) may be used to connect multiple geographically dispersed access networks (also known as customer networks) via a wide area network. An access network (AN) is a network, which connects an access device of a host to a core switching device. One example technology for carrying user traffic through a transport network is Transparent Interconnection of Lots of Links (TRILL), which is a Layer 2 (L2) network standard recommended by Internet Engineering Task Force (IETF). TRILL is configured to solve deficiencies of Spanning Tree Protocol (STP) in a large-scale data center. In a TRILL network, a device running a TRILL protocol may be referred to as a Routing Bridge (RB) device. The RB device may transmit a Hello packet periodically, so as to discover and maintain a neighbor relationship with a neighbor RB. Another example is Ethernet Virtual Interconnect (EVI) where a site network may access a public network via an edge device (ED).

BRIEF DESCRIPTIONS OF THE DRAWINGS

Features of the present disclosure are illustrated by way of examples and not limited in the following drawings, in which like numerals indicate like elements:

DETAILED DESCRIPTION

Figure 1:
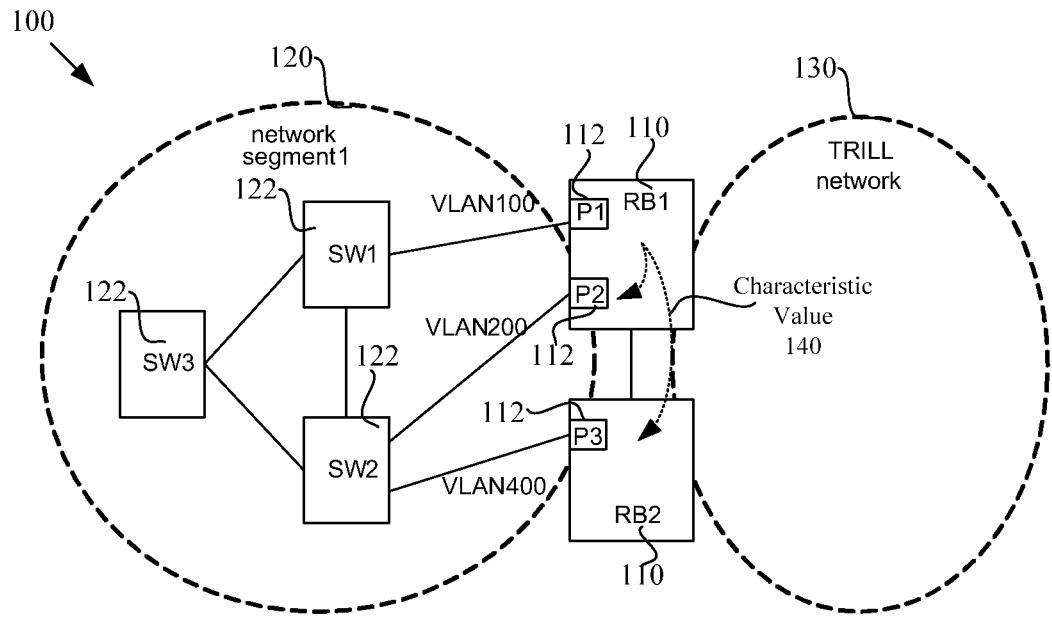
FIG. 1 is a schematic diagram illustrating an example network, in which TRILL is used.

For simplicity and illustrative purposes, the present disclosure is described by referring to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used throughout the present disclosure, the term "includes" means includes but not limited to, the term "including" means including but not limited to. The term "based on" means based at least in part on. In addition, the terms "a" and "an" are intended to denote at least one of a particular element.

In an AN (e.g. TRILL access network or EVI site network etc.), a VLAN forwarder may be allocated to a VLAN such that all traffic of the VLAN is forwarded to and from the AN via the VLAN forwarder. In certain circumstances such as when the network topology changes, the VLAN forwarder may block the traffic of its allocated VLAN for a period of time to avoid traffic looping. During this period, traffic of the VLAN may be interrupted, thereby affecting the quality and performance of the AN.

The present disclosure describes rapid convergence of an AN. A VLAN forwarder is allocated to a first Virtual Local Area Network (VLAN) and traffic for the first VLAN is forwarded to and from the AN via the VLAN forwarder. When detecting that the VLAN forwarder satisfies a VLAN reallocation condition, the VLAN forwarder blocks traffic of the first VLAN to and from the AN via the VLAN forwarder, and calculates a characteristic value of the VLAN forwarder. A packet carrying the characteristic value of the VLAN forwarder is transmitted to each neighbor VLAN forwarder such that VLAN reallocation is performed by a VLAN allocator if the characteristic value of the VLAN forwarder is the same as that of each neighbor VLAN forwarder. After receiving information that the VLAN forwarder is reallocated to a second VLAN, the VLAN forwarder allows the traffic of the second VLAN to and from the AN via the VLAN forwarder.

According to the example of the present disclosure, the VLAN forwarder calculates and transmits its characteristic value when VLAN reallocation condition is satisfied. Based on the characteristic value of the VLAN forwarder, VLAN reallocation is performed to facilitate a quicker recovery from a traffic blocking period. As such, convergence speed of the AN may be accelerated and network performance improved.

It will be appreciated that the terms "first" and "second" here are merely used to represent the VLAN allocated to the VLAN forwarder prior to the reallocation (i.e. "first VLAN"), and after the reallocation (i.e. "second VLAN") respectively. In practice, the "first VLAN" and "second VLAN" may be the same, different or overlap with each other depending on the reallocation. Further, the term "first VLAN" refers to the VLAN to which the VLAN forwarder is allocated, and may include multiple VLANs in practice.

In the following, rapid convergence of AN is discussed with reference to two example technologies, i.e. TRILL in FIG. 1 and EVI in FIG. 2. However, it will be appreciated that any other suitable technology may be used in place of TRILL and EVI.

FIG. 1 is a schematic diagram illustrating an example network 100, in which the same network segment accesses 120 a TRILL network 120 via multi-homing. The network 100 includes routing bridge devices 110 (i.e. RB1, RB2), and switches 122 (i.e. SW1, SW2, SW3) belonging to the same network segment 120 (i.e. network segment 1). SW1 and SW2 may access the TRILL network 130 via multi-homing. As shown in FIG. 1, SW1 accesses RB1 via port P1, SW2 accesses RB1 via port P2, and SW2 accesses RB2 via port P3. RB1 and RB2 are multi-homing devices with ports 112 P1 and P2, and P3 respectively.

To avoid traffic looping, access and egress to the TRILL network 130 for all traffic of each Virtual Local Area Network (VLAN) within the same network segment may employ the same RB and the same port. The port may be referred to as an Appointed VLAN-x Forwarder (AVF) ("VLAN forwarder") of the VLAN, where 'x' represents an identifier of the VLAN.

As shown in FIG. 1, port P1 is the AVF of VLAN100, port P2 is the AVF of VLAN200 and port P3 is the AVF of VLAN400. All RBs within the same network segment 120 (that is, each RB accessing the network segment 120) may interact with each other using a Hello packet etc., such as to elect a Designated RB (DRB). Subsequently, the DRB may allocate an AVF for each VLAN of the network segment.

When a root bridge of a network segment located by an AVF changes, or an AVF of VLAN-x changes (the DRB may reallocate a new AVF for VLAN-x that is different from the current AVF), to avoid traffic looping, the current AVF needs to block traffic of VLAN-x for a period of time, such as for a default time period of 30 seconds. Within the period, traffic of VLAN-x may not access the TRILL network.

In an EVI site network, similar cases may also occur. FIG. 2 is a schematic diagram illustrating an example EVI network 200. In this case, the AN is in the form of an EVI site network 220.

By adopting EVI technologies, the network 200 may be divided into a Core Network (CN, public network) 230 and site networks (private networks) 220. To provide better services, the CN generally provides L2 Virtual Private Network (VPN) services. Each site network 220 may access the CN 230 via an Edge Device (ED) 210. A Point-to-Point (P2P) channel 232 may be established between EDs, to implement L2 interconnection. To guarantee reliability of data transmission between sites 220 and to simultaneously implement load sharing, multiple EDs 210 may generally be used within a network site 220. The multiple EDs 210 may access the CN 230 via multi-homing, which may be referred to as multi-homing EDs 210. The multi-homing EDs 210 may interact with each other using a Hello packet etc., and elect a Designated ED (DED). The elected DED may allocate an Appointed Edge Forwarder (AEF) ("VLAN forwarder") for each VLAN. The AEF is one of the multiple multi-homing EDs that may enable all local traffic of each VLAN to access the CN 230 via the AEF.

Figure 2:
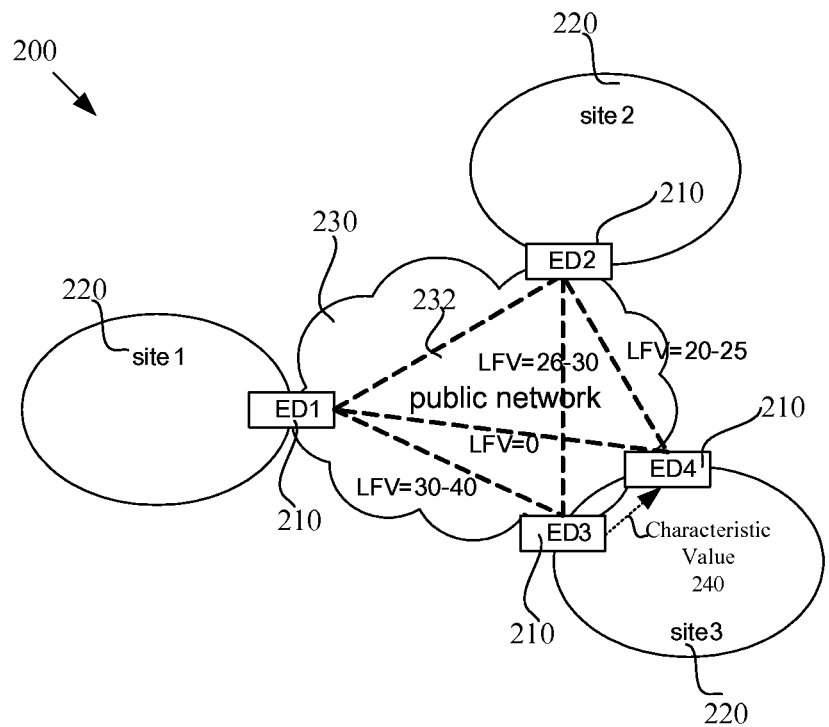
FIG. 2 is a schematic diagram illustrating an example network, in which Ethernet Virtual Interconnect (EVI) is used.

In the example in FIG. 2, the network 200 includes multiple sites 220, i.e site 1, site 2 and site 3. The EDs 210 of sites 1 and 2 are respectively ED1 and ED2. The EDs 220 of site 3 are ED3 and ED4, which may access the CN 230 via multi-homing. ED3 may interact with ED4 using a Hello packet, ED3 and ED4 may elect a DED (which may be ED3, or ED4) to allocate an AEF for each VLAN. As shown in FIG. 2, the AEF allocated for VLAN26-VLAN40 is ED3 (see 'LFV=26-30' and 'LFV=30-40'). The AEF allocated for VLAN20-VLAN25 is ED4 (see 'LFV=20-25').

After allocating an AEF for VLAN-x, the AEF may carry all traffic of VLAN-x to access or leave a site (e.g. ED3 for VLAN26-VLAN40). However, the network topology of the site may change, e.g. due to site division, site fusion etc. To avoid traffic looping, the AEF needs to temporarily block traffic of a conflicting VLAN. During the period, traffic of the VLAN cannot access the EVI site network.

Figure 3:
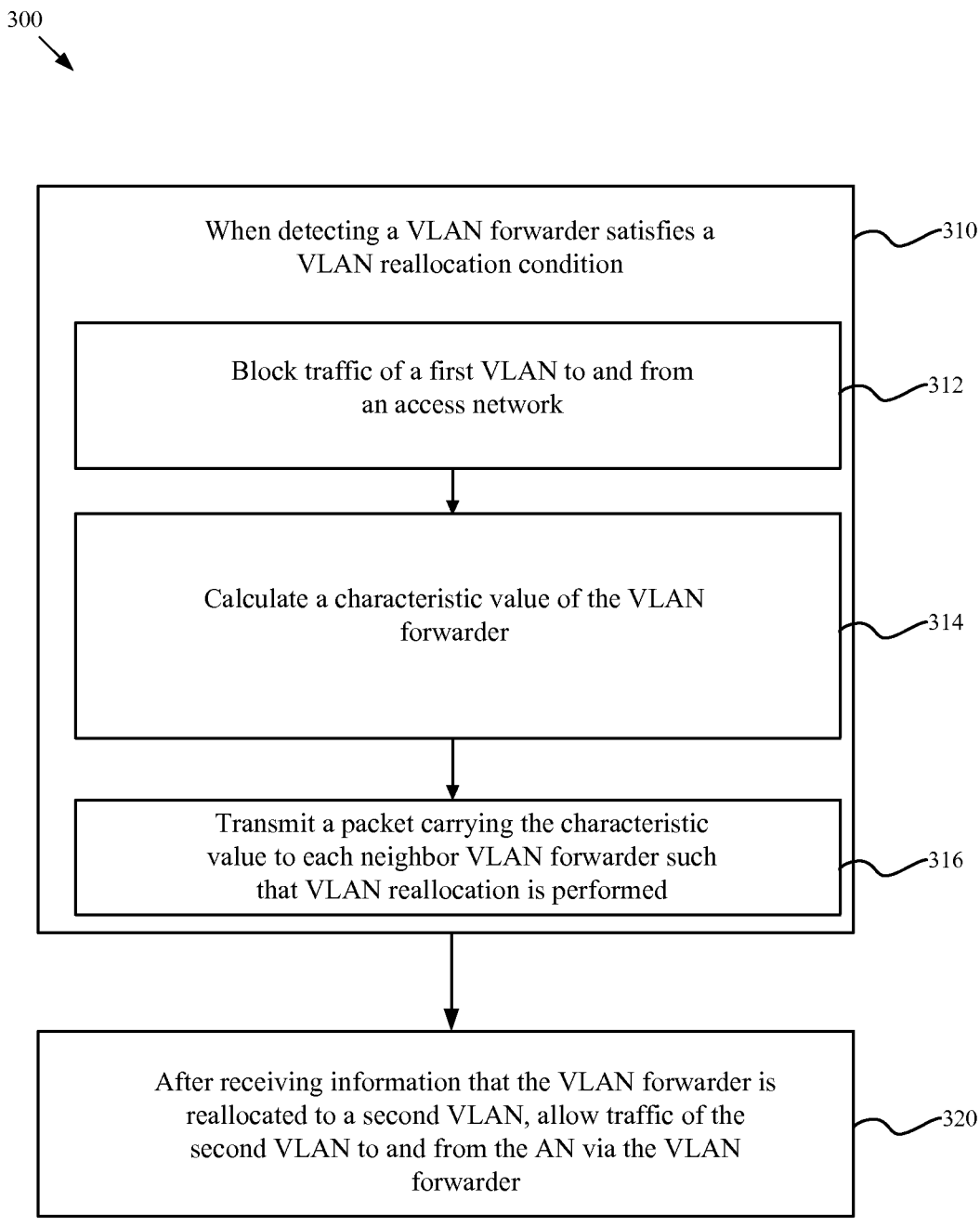
FIG. 3 is a flowchart illustrating an example rapid convergence method of an Access Network (AN) which may be performed by a device capable of acting as a Virtual Local Area Network (VLAN) forwarder.

FIG. 3 is a flowchart 300 illustrating an example rapid convergence method of an AN (e.g. TRILL or EVI) where a VLAN forwarder (e.g. AVF or AEF) is allocated to a first VLAN to forward traffic of the first VLAN to and from the AN.

At block 310, when detecting that a VLAN forwarder (e.g. port P1 in FIG. 1 or ED3 in FIG. 2) satisfies a VLAN reallocation condition, the VLAN forwarder (also referred to as the current VLAN forwarder):

Blocks traffic of the first VLAN (e.g. VLAN100 for P1 or VLAN26-40 for ED3) to which the VLAN forwarder is allocated (block 312).

Calculates a characteristic value of the VLAN forwarder (block 314).

Transmits a packet carrying the characteristic value (e.g., 140 of FIGS. 1 and 240 of FIG. 2) of the VLAN forwarder to each neighbour VLAN forwarder (block 316). In practice, the characteristic value may be carried in a Hello packet.

At block 320, after the VLAN forwarder is reallocated to a second VLAN, the VLAN forwarder allows traffic of the second VLAN to and from the AN via the VLAN forwarder.

As shown in the examples, the AN may be a TRILL access network 120 (e.g. FIG. 1), or an EVI site network 220 (e.g. FIG. 2).

When the AN is a TRILL access network 120, the AN may access a TRILL network 130 via multiple multi-homing RBs. A VLAN forwarder refers to any port accessing the AN in the multiple RBs 110. Each port in the multiple RBs, which accesses the AN, is a neighbor VLAN forwarder. Taking FIG. 1 as an example, the TRILL access network 130 is network segment 1. Port P1 accessing network segment 1 in RB1, port P2 accessing network segment 1 in RB1 and port P3 accessing network segment 1 in RB2 are VLAN forwarders. P1, P2 and P3 are also neighbor VLAN forwarders.

Traffic of each VLAN in the TRILL access network 130 may access or leave the TRILL network 120 via a port (see 112 in FIG. 1). Thus, to facilitate traffic forwarding to and from the TRILL access network 130 via the port 112, VLANs are allocated for ports accessing the TRILL access network 130 in the multiple multi-homing RBs 110. In particular, for each VLAN, a port 112 is selected from all ports 112 accessing the TRILL access network 130 in the multiple multi-homing RBs 110. The selected port 112 may be taken as a VLAN forwarder of the VLAN, which is to forward VLAN traffic from the TRILL access network 130 to the TRILL network 120, and to forward VLAN traffic from the TRILL network 120 to the TRILL access network 130. The selected port 112 may be referred to as the AVF of the VLAN. Each port 112 accessing the TRILL access network 130 in the multiple multi-homing RBs 110 may carry the traffic of some VLANs in the TRILL access network, in which case the port 112 is referred to as the VLAN forwarder of its allocated VLANs. VLAN reallocation may be triggered when VLAN configuration of any port changes. In addition, each port 112 accessing the TRILL access network 130 may also receive a Spanning Tree Protocol (STP) packet from the TRILL access network 130. The STP packet may carry root bridge list information of the TRILL network 120. The VLAN reallocation may also be triggered when the root bridge in the TRILL access network 130 changes.

When the AN is the EVI site network 220 (see FIG. 2 again), the AN may access the CN (public network) 230 via multiple multi-homing EDs 210. In this case, the VLAN forwarder refers to an ED 210 within an EVI site 220. The multiple EDs 210 (e.g. ED3 and ED4 in FIG. 2) are neighbor VLAN forwarders.

In the EVI site network 220, to avoid traffic looping, traffic of each VLAN may access or leave the public network 230 via one of the multiple multi-homing EDs 210. Thus, VLANs are allocated for the multiple multi-homing EDs to forward traffic to and from the EVI site network 220. An ED (e.g. ED3) is selected from multiple multi-homing EDs (e.g. ED3 and ED4) as a VLAN forwarder of a VLAN (e.g. VLAN26-VLAN40), which is to forward traffic of the VLAN from the EVI site network 220 to the public network 230, and forward traffic of the VLAN from the public network 230 to the EVI site network 220. In example implementations, the selected ED 210 may be the AEF of the VLAN, in which case the VLAN may be referred to as an active VLAN of the selected ED 210. Each ED 210 in the multiple multi-homing EDs may carry traffic of some VLANs in the EVI site network 220, in which case ED 210 is referred to as the VLAN forwarder of those VLANs. VLAN reallocation may be triggered when the VLAN configuration (or, configuration of an extended VLAN) of any ED 210 changes. In addition, the multiple multi-homing EDs 210 may also receive an STP packet from the EVI site network 220. The STP packet may carry root bridge list information of the EVI site network 220. The VLAN reallocation may also be triggered when the root bridge of the EVI site network 220 changes.

Thus, it can be seen from the above examples that regardless of whether the AN is a TRILL access network 120 or EVI site network 220, the VLAN reallocation conditions are generally the same. Thus, in one example, the VLAN forwarder may determine whether the VLAN forwarder satisfies a condition to activate or trigger VLAN reallocation as follows. When the VLAN configuration of the current VLAN forwarder changes, the current VLAN forwarder determines that it has satisfied a VLAN reallocation condition. Alternatively, after the current VLAN forwarder receives an STP packet from the AN, and the root bridge list carried in the STP packet is not consistent with root bridge list recorded by the current VLAN forwarder, determine that the current VLAN forwarder satisfies the VLAN reallocation condition. Meanwhile, the recorded root bridge list is updated according to the STP packet.

When detecting that the VLAN forwarder satisfies the VLAN reallocation condition, the VLAN forwarder blocks traffic of all its allocated VLANs to access or leave the AN via the VLAN forwarder, and interact with all of its neighbor VLAN forwarders using a packet, which may be a Hello packet etc.

For example, after detecting that the current VLAN forwarder (e.g. P1 or ED3) satisfies the VLAN reallocation condition, the current VLAN forwarder may transmit a Hello packet carrying the characteristic value of the current VLAN forwarder to all of its neighbor VLAN forwarders (e.g. P1 transmits to P2 and P3, or ED3 to ED4). Similarly, the current VLAN forwarder may also receive a Hello packet transmitted by its neighbor VLAN forwarder, which carries the characteristic value of that neighbor VLAN forwarder (e.g. P1 receives from P2 and P3, or ED3 from ED4).

After receiving the Hello packet transmitted by the neighbor VLAN forwarder (e.g. P2 and P3 or ED4), the current VLAN forwarder (e.g. P1 or ED3) may update its characteristic value according to the Hello packet, and compare its characteristic value with that carried in the received Hello packet. If the characteristic value of current VLAN forwarder is different from the characteristic value carried in the received Hello packet, it means that topologies are inconsistent. If the current VLAN forwarder (e.g. P1 or ED3) has already blocked the traffic of all of the VLANs to access or leave the AN via the current VLAN forwarder, the blocking state needs to be continuously maintained. Otherwise, if the current VLAN forwarder has not blocked the traffic of all of the VLANs to access or leave the AN via current VLAN forwarder, it will do so.

In the example shown in FIG. 3, the packet carrying the characteristic value of the VLAN forwarder at block 316 may further carry feature or characteristic information of the VLAN forwarder transmitting the packet.

The characteristic value of the current VLAN forwarder (e.g. P1 or ED3) may be calculated or updated as follows.

Calculate a local abstract corresponding to the current VLAN forwarder according to the feature information of the current VLAN forwarder.

Calculate a neighbor abstract corresponding to the neighbor VLAN forwarder according to the recorded feature information of each neighbor VLAN forwarder.

Calculate the characteristic value of the current VLAN forwarder, according to the local abstract corresponding to the current VLAN forwarder and the neighbor abstract corresponding to each neighbor VLAN forwarder.

When the AN is a TRILL access network 120 (see FIG. 1), the feature information of the VLAN forwarder (e.g. P1 or ED3) may include a port number of the VLAN forwarder, a system identifier of an RB on which the VLAN forwarder is located, an allowed VLAN list of the VLAN forwarder (i.e. a list of VLANs for which access is allowed by the VLAN forwarder), and a root bridge list recorded by the VLAN forwarder.

In this case, the local abstract corresponding to current VLAN forwarder may be calculated according to the feature information of current VLAN forwarder as follows.

Employ a predetermined abstract calculation algorithm to perform a calculation based on the port number of current VLAN forwarder, the system identifier of the RB located by current VLAN forwarder, the allowed VLAN list of the current VLAN forwarder, and the root bridge list recorded by current VLAN forwarder.

Take a result of the calculation as the local abstract corresponding to current VLAN forwarder.

In one example, the neighbor abstract corresponding to the neighbor VLAN forwarder may be calculated according to the recorded feature information of each neighbor VLAN forwarder as follows.

Employ a predetermined abstract calculation algorithm to perform a calculation based on the port number of the neighbor VLAN forwarder, the system identifier of the RB located by the neighbor VLAN forwarder, the allowed VLAN list of the neighbor VLAN forwarder, and the root bridge list recorded by the neighbor VLAN forwarder.

Take a result of the abstract calculation as the neighbor abstract corresponding to the neighbor VLAN forwarder.

When the AN is an EVI site network 220 (see FIG. 2), the feature information of the VLAN forwarder may include a port number of the VLAN forwarder, a system identifier of an ED located by the VLAN forwarder, an allowed VLAN list of the VLAN forwarder, and a root bridge list recorded by the VLAN forwarder.

In one example, the local abstract corresponding to current VLAN forwarder may be calculated according to the feature information of current VLAN forwarder as follows.

Employ a predetermined abstract calculation algorithm to perform a calculation based on the port number of the current VLAN forwarder, the system identifier of the ED located by the current VLAN forwarder, the allowed VLAN list of current VLAN forwarder, and the root bridge list recorded by current VLAN forwarder.

Take a result of the abstract calculation as the local abstract corresponding to current VLAN forwarder.

In one example, the neighbor abstract may be calculated as follows.

Employ a predetermined abstract calculation algorithm to perform a calculation based on the port number of the neighbor VLAN forwarder, the system identifier of the ED located by the neighbor VLAN forwarder, the allowed VLAN list of the neighbor VLAN forwarder, and the root bridge list recorded by the neighbor VLAN forwarder.

Take a result of the abstract calculation as the neighbor abstract corresponding to the neighbor VLAN forwarder.

In the example shown in FIG. 3, any suitable algorithm may be used. For example, the predetermined abstract calculation algorithm is MD5 algorithm.

In one example, the characteristic value of current VLAN forwarder may be calculated according to the local abstract corresponding to current VLAN forwarder and the neighbor abstract corresponding to each neighbor VLAN forwarder as follows.

Perform a summing operation on the local abstract and the neighbor abstract.

Take a result of the summing operation as the characteristic value of current VLAN forwarder.

Figure 4:
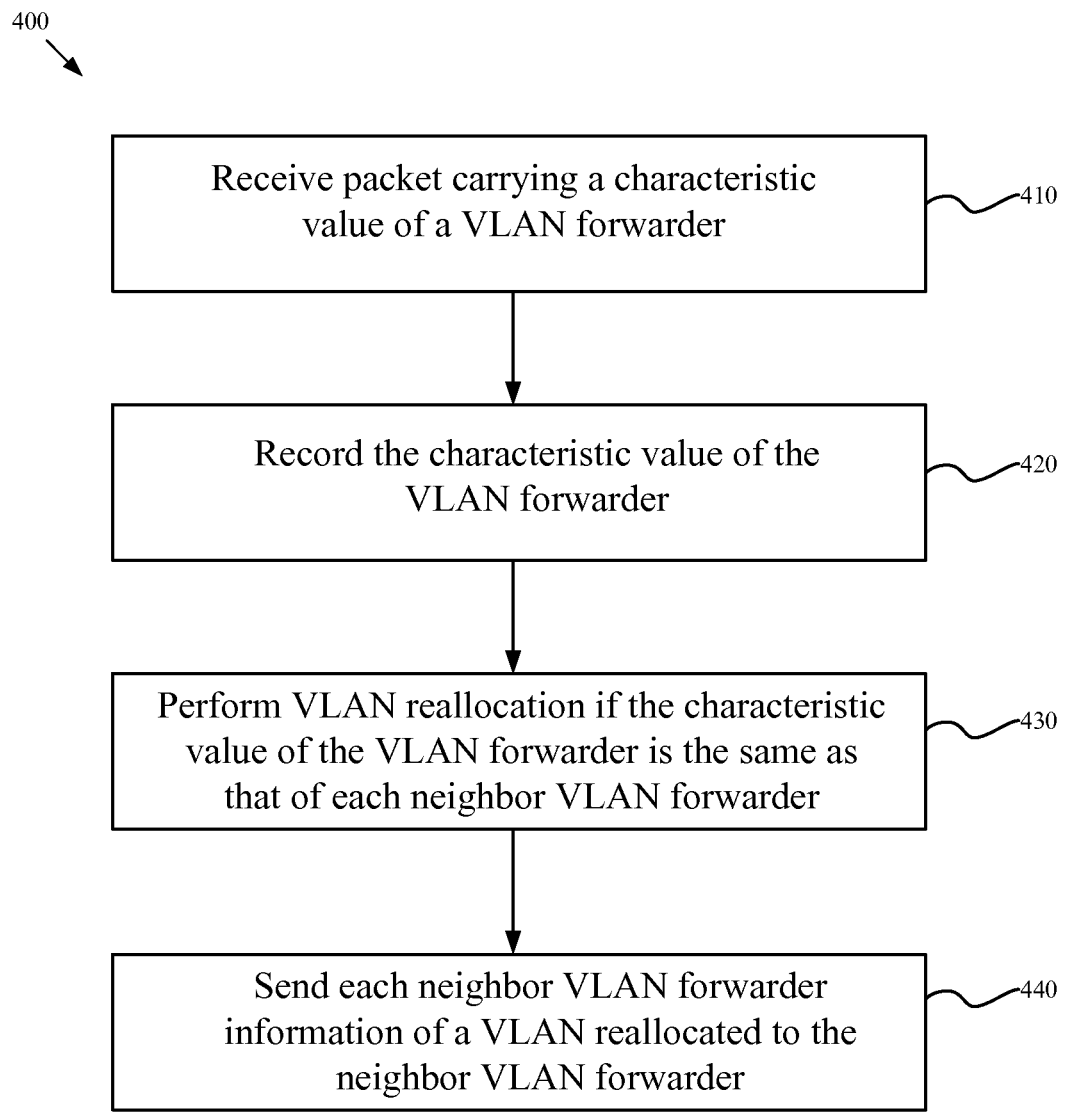
FIG. 4 is a flowchart illustrating an example rapid convergence method of an AN which may be performed by a device capable of acting as a VLAN allocator.

FIG. 4 shows an example VLAN reallocation process performed by a VLAN allocator, which may be the current VLAN forwarder (e.g. P1 or ED3) itself or a different VLAN forwarder (e.g. P3 or ED4). A VLAN allocator may be elected from all the neighbor VLAN forwarders. For example, the current VLAN forwarder (e.g. P1 or ED3) may be elected as a VLAN allocator. A different VLAN forwarder may also be elected.

At block 410, the VLAN allocator receives a packet carrying a characteristic value of a VLAN forwarder.

At block 420, after receiving a packet carrying a characteristic value of a neighbor VLAN forwarder (the packet is transmitted by each neighbor VLAN forwarder), the VLAN allocator may record the characteristic value of the neighbor VLAN forwarder.

At block 430, when the characteristic value of current VLAN forwarder is the same as the recorded characteristic value of each neighbor VLAN forwarder, VLAN reallocation is performed, i.e. the VLAN allocator reallocates the VLAN forwarder for each VLAN in the AN.

At block 440, the VLAN allocator sends the VLAN forwarder about information of a VLAN (also referred to as the "second VLAN" at block 320 in FIG. 3) allocated for each VLAN forwarder.

In practice, a VLAN allocator may be elected from multiple VLAN forwarders at block 410. When allocating VLANs, the VLAN allocator may execute VLAN allocation operations.

When the AN is a TRILL access network 120, a DRB may be elected from multiple multi-homing RBs 110. A main port 112 may be elected by the DRB from all of the ports 112 accessing the AN in the DRB. In one example, the main port 112 may be used as the VLAN allocator in charge of executing VLAN allocation operations. The main port 112 may simultaneously possess functions of VLAN forwarder and VLAN allocator.

When the AN is a EVI site network 220, a DED may be elected from the multiple multi-homing EDs 210. Take the DED as the VLAN allocator in charge of executing VLAN allocation operations. The DED may simultaneously possess functions of VLAN forwarder (that is, ED) and VLAN allocator (that is, DED).

When a VLAN forwarder is elected as a VLAN allocator, after receiving the Hello packet transmitted by each neighbor VLAN forwarder, in addition to updating the characteristic value of the VLAN allocator, the VLAN allocator may also record the characteristic value of the neighbor VLAN forwarder. If the characteristic value of the VLAN allocator is the same as the characteristic value of each neighbor VLAN forwarder, this means there is no topology conflict in the AN. The VLAN reallocation may be executed. When a VLAN forwarder is elected as the VLAN allocator, the elected VLAN forwarder may possess functions of VLAN forwarder and VLAN allocator.

After receiving the Hello packet carrying the characteristic value of the neighbor VLAN forwarder transmitted by each neighbor VLAN forwarder, the current VLAN forwarder records the feature information about the neighbor VLAN forwarder carried in the Hello packet, before updating the characteristic value of current VLAN forwarder.

VLAN allocation performed by the VLAN allocator may be different for with different ANs. In the TRILL access network, any suitable AVF allocation method may be employed. In the EVI site network, any suitable AEF allocation method (which may be referred to as an active VLAN allocation method) may be employed.

After performing the VLAN reallocation, the VLAN allocator then informs a VLAN forwarder of a VLAN allocated ("second VLAN" for each VLAN forwarder, to enable the VLAN forwarder to receive a packet from or transmit a packet to the VLAN allocated for the VLAN forwarder. In addition, when informing the VLAN forwarder about the information of the VLAN allocated for each VLAN forwarder, the VLAN allocator may also inform the VLAN forwarder about the characteristic value of the VLAN allocator.

Referring to block 320 in FIG. 3 again, the current VLAN forwarder may receive the information of the VLAN allocated for current VLAN forwarder from the VLAN allocator, and allow the traffic of the VLAN allocated for current VLAN forwarder to and from the AN.

At block 320, after receiving the information of the VLAN allocated for the VLAN forwarder, which is informed by the VLAN allocator, the VLAN forwarder may remove previous blocking state (that blocks traffic of all VLANs to access or leave the AN via the VLAN forwarder), and allow the traffic of all VLANs allocated for the VLAN forwarder. In addition, when informed by the VLAN allocator of the VLAN allocated for current VLAN forwarder, the current VLAN forwarder may further receive the characteristic value from the VLAN allocator, so as to compare the characteristic value of current VLAN forwarder with that received from the VLAN allocator. In this case, the current VLAN forwarder may confirm once again whether a topology conflict exists in the AN. When the characteristic value of current VLAN forwarder is the same as the characteristic value informed by the VLAN allocator, it means that there is no topology conflict in the AN. The current VLAN forwarder may allow traffic of all VLANs allocated for current VLAN forwarder. When the characteristic value of the current VLAN forwarder is different from the characteristic value informed by the VLAN allocator, it means that the topology conflict still exists in the AN. In this case, the current VLAN forwarder continuously blocks traffic of all VLANs to access or leave the AN via current VLAN forwarder.

Here, when the AN is the TRILL access network 130, after receiving the information of the VLAN allocated by the VLAN allocator for the VLAN forwarder, the VLAN forwarder may become the AVF of all VLANs allocated for the VLAN forwarder. When the AN is the EVI site network, after receiving the information of the VLAN allocated by the VLAN allocator for the VLAN forwarder, the VLAN forwarder may become the AEF of all of the VLANs allocated for the VLAN forwarder.

The present disclosure also provides a device for rapid convergence of an AN. Examples will be provided below with reference to FIG. 5 and FIG. 6.

Figure 5:
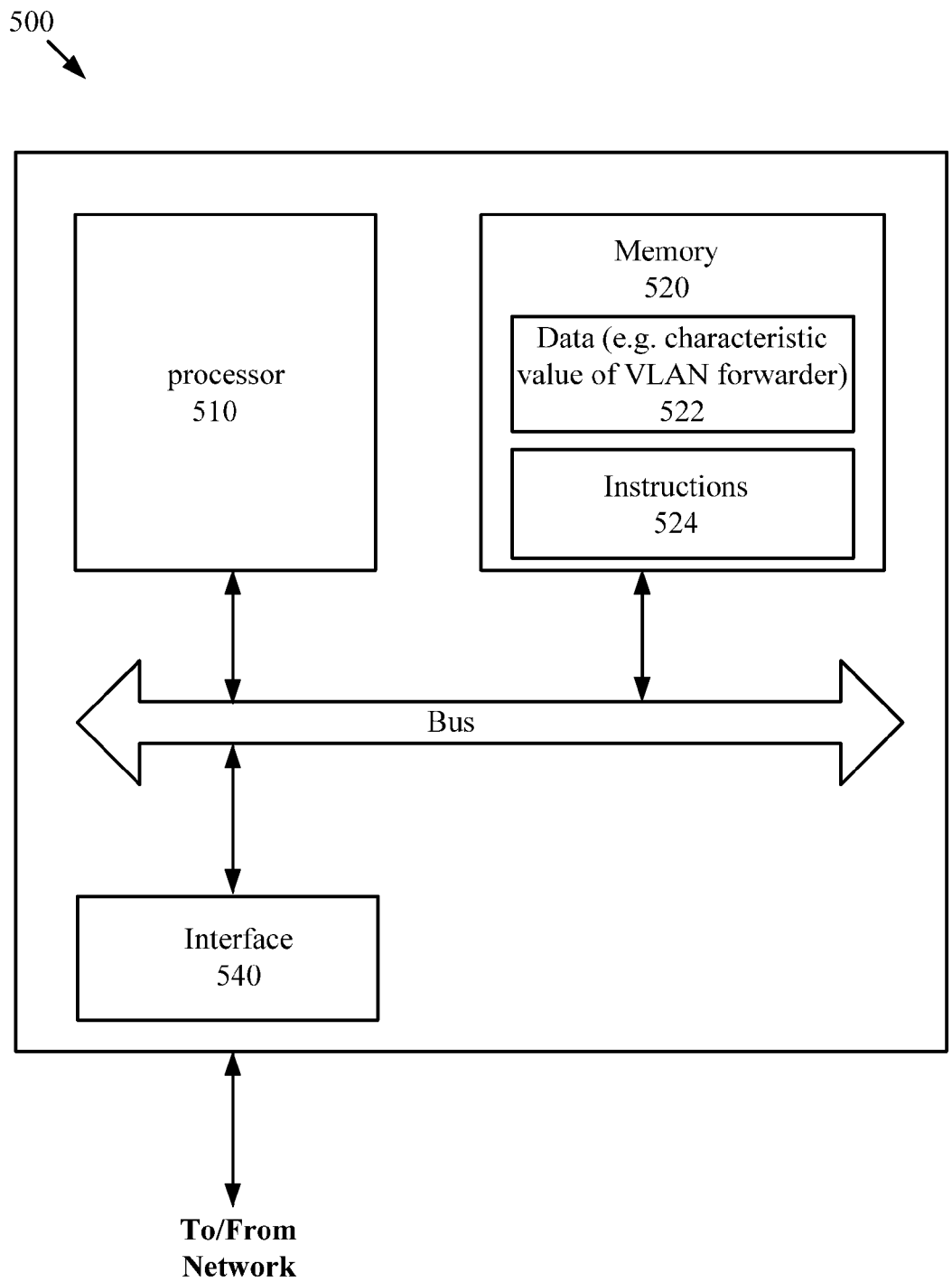
FIG. 5 is a schematic diagram of an example device for rapid convergence device of an AN.

FIG. 5 is a schematic diagram of an example device 500 for rapid convergence of an AN. The device 500 may include memory or storage 520, and a processor 510 in communication with storage 520. The processor 510 is to implement rapid convergence of an AN as explained above with reference to FIG. 1 to FIG. 4. In one example, the device 500 is capable of acting as a VLAN forwarder that is allocated to a first VLAN to forward traffic of the first VLAN to and from the AN and comprises a processor to (see also FIG. 3):

when detecting that the VLAN forwarder satisfies a VLAN reallocation condition, block traffic of the first VLAN to and from the Access Network via the VLAN forwarder, calculate a characteristic value of the VLAN forwarder, and transmit a packet carrying the characteristic value of the VLAN forwarder to each neighbor VLAN forwarder such that VLAN reallocation is performed by a VLAN allocator if the characteristic value of the VLAN forwarder is the same as that of each neighbor VLAN forwarder; and after receiving information that the VLAN forwarder is reallocated to a second VLAN, allow the traffic of the second VLAN to and from the AN via the VLAN forwarder.

Figure 6:
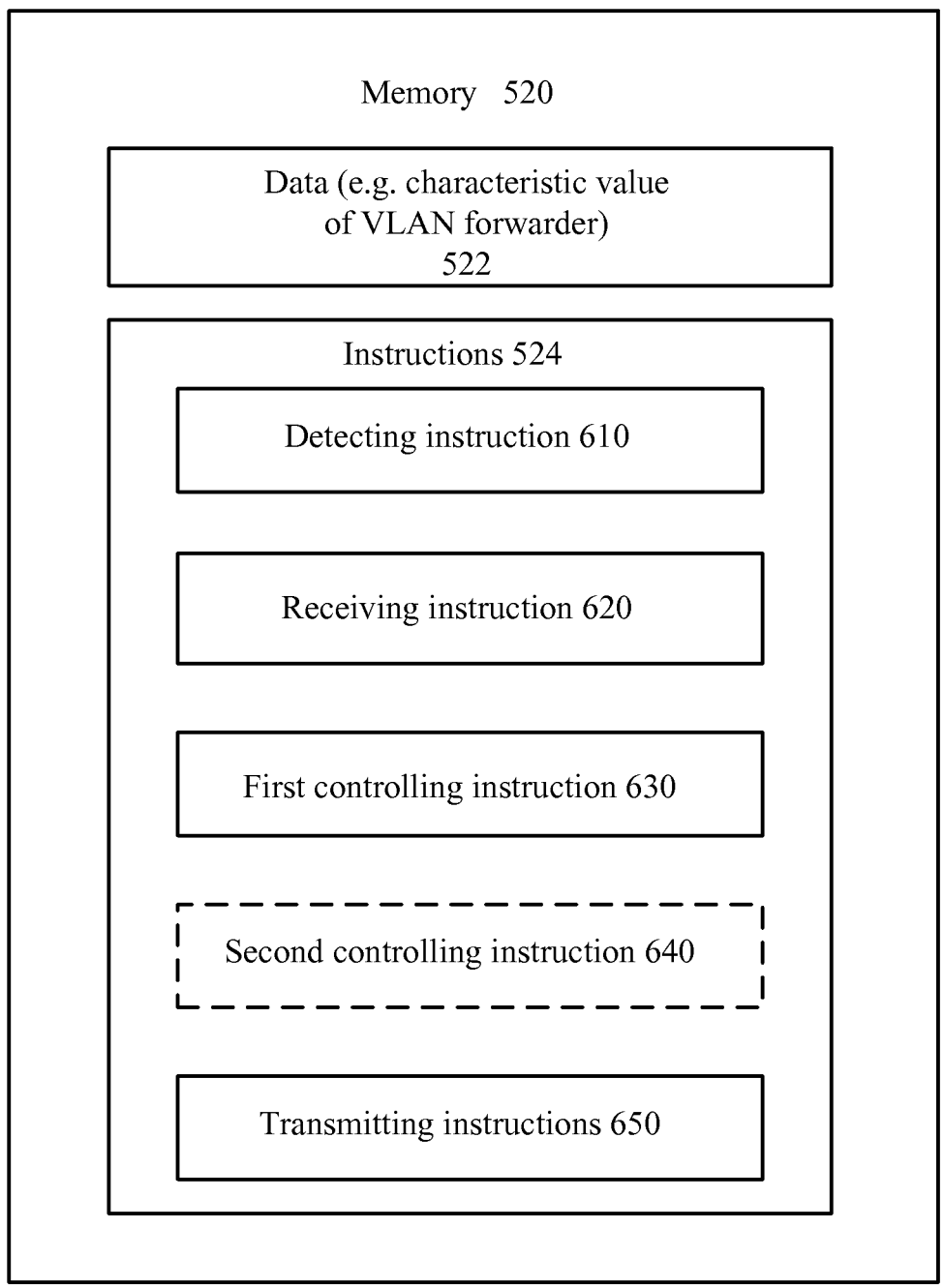
FIG. 6 is a schematic diagram of example instructions stored in a memory and executable by a processor of a device for rapid convergence device of an AN.

The memory or storage 520 may store a characteristic value calculated by the VLAN forwarder or a neighbour VLAN forwarder. The memory 520 may also store instructions 524 executable by the processor 510 for rapid convergence of the AN. One example of the instructions 524 is shown in FIG. 6, which may include detecting instruction 610, receiving instruction 620, first controlling instruction 630, and transmitting instruction 650. It should be understood that although the instructions 610 to 650 may be combined or divided in any suitable way, and not limited to the examples shown in FIG. 6.

In one example, the rapid convergence device may be capable of acting as a VLAN forwarder. In this case, the detecting instruction 610 is to detect whether the device satisfies a VLAN reallocation condition. Receiving instruction 620 is to receive a packet carrying a characteristic value of a neighbor VLAN forwarder, which is transmitted by each neighbor VLAN forwarder. Receiving instruction 620 is further to receive information of a VLAN allocated for current VLAN forwarder from a VLAN allocator. In one example, the packet may be a Hello packet. It should be noted that, the packet is not limited to the Hello packet in practice.

When detecting that the device satisfies the VLAN reallocation condition, according to detecting instruction 610, the first controlling instruction 630 is to block traffic of all VLANs (also referred to as "first VLAN") to access or leave an AN via current VLAN forwarder, calculate a characteristic value of current VLAN forwarder, and execute transmitting instruction 650 to transmit a packet carrying the characteristic value of current VLAN forwarder to all neighbor VLAN forwarders. After receiving VLAN reallocation information of the current VLAN forwarder from the VLAN allocator according to receiving instruction 620, the first controlling instruction 630 is further to allow the traffic of all the VLANs (referred to as "second VLAN") allocated for current VLAN forwarder.

In one example, the device 500 may be capable as acting as a VLAN allocator when elected as one. In this case, the memory 520 may further store a second controlling instruction 640. After receiving a packet carrying the characteristic value of a neighbor VLAN forwarder according to receiving instruction 620, the packet being transmitted by each neighbor VLAN forwarder, the second controlling instruction 640 is further to record the characteristic value of the neighbor VLAN forwarder. If the characteristic value of the device (i.e. acting as a VLAN allocator) is the same as the recorded characteristic value of each neighbor VLAN forwarder, the second controlling instruction 640 is further to reallocate a VLAN forwarder for each VLAN in the AN, and to execute transmitting instruction 650 to inform a VLAN forwarder about information of a VLAN allocated ("second VLAN") for each VLAN forwarder.

After receiving the packet carrying the characteristic value of the neighbor VLAN forwarder according to the receiving instruction 620, the first controlling instruction 630 is further to update the characteristic value of current VLAN forwarder. When the updated characteristic value of current VLAN forwarder is different from the characteristic value of the neighbor VLAN forwarder carried in the packet, the first controlling instruction 630 is to block the traffic of all VLANs ("first VLAN") to access or leave the AN via current VLAN forwarder.

In the above example device, the receiving instruction 620 executable by processor 42 and stored in memory 520, is further to receive an STP packet from the AN.

When detecting whether the device satisfies the VLAN reallocation condition, detecting instruction 610 is to detect whether VLAN configuration of current VLAN forwarder changes, and when detecting the VLAN configuration of current VLAN forwarder changes, to determine that the device satisfies the VLAN reallocation condition.

Alternatively, when receiving the STP packet from the AN according to receiving instruction 620, and the root bridge list carried in the STP packet is not consistent with the root bridge list recorded by the current VLAN forwarder, detecting instruction 610 is to update the recorded root bridge list according to the STP packet, and determine that the device satisfies the VLAN reallocation condition.

In the above example device, when the AN is a TRILL access network (e.g. see FIG. 1), the AN may access the TRILL network via multiple multi-homing RBs. The device may be any one of the ports accessing the AN in the multiple RBs. Each port accessing the AN in the multiple RBs is a neighbor VLAN forwarder. The VLAN allocator is a main port elected by a DRB from all ports accessing the AN in the DRB, in which the DRB is elected from the multiple RBs.

In another example, when the AN is an EVI site network (e.g. FIG. 2), the AN may access a public network via multiple multi-homing EDs. The device may be one of the multiple EDs. The multiple EDs are neighbor VLAN forwarders. The VLAN allocator may be a DED elected from the multiple EDs.

When the AN is a TRILL access network, the packet may further carry feature information of a VLAN forwarder, which transmits the Hello packet. The feature information of the VLAN forwarder may include a port number of the VLAN forwarder, a system identifier of an RB located by the VLAN forwarder, an allowed VLAN list of the VLAN forwarder, and a root bridge list recorded by the VLAN forwarder.

After receiving the packet carrying the characteristic value of the neighbor VLAN forwarder from each neighbor VLAN forwarder, the first controlling instruction 630 is further to record the feature information of the neighbor VLAN forwarder carried in the packet, before updating the characteristic value of current VLAN forwarder.

When calculating or updating the characteristic value of current VLAN forwarder, the first controlling instruction 630 is further to:

calculate the local abstract corresponding to current VLAN forwarder according to the feature information of current VLAN forwarder;

calculate the neighbor abstract corresponding to the neighbor VLAN forwarder according to the recorded feature information of each neighbor VLAN forwarder; and calculate the characteristic value of current VLAN forwarder according to the local abstract corresponding to current VLAN forwarder and the neighbor abstract corresponding to each neighbor VLAN forwarder.

When calculating the local abstract, the first controlling instruction 630 is further to employ a predetermined abstract calculation algorithm to perform a calculation based on the port number of current VLAN forwarder, the system identifier of the RB (i.e. device) located by current VLAN forwarder, the allowed VLAN list of current VLAN forwarder, and the root bridge list recorded by current VLAN forwarder, and take a result of the calculation as the local abstract corresponding to current VLAN forwarder.

When calculating the neighbor abstract, the first controlling instruction 630 is further to employ a predetermined abstract calculation algorithm to perform a calculation based on the port number of the neighbor VLAN forwarder, the system identifier of the RB located by the neighbor VLAN forwarder, the allowed VLAN list of the neighbor VLAN forwarder, and the root bridge list recorded by the neighbor VLAN forwarder, and then take a result of the calculation as the neighbor abstract corresponding to the neighbor VLAN forwarder.

Similarly, when the AN is an EVI site network, the packet may further carry feature information of a VLAN forwarder, which transmits the packet. The feature information of the VLAN forwarder may include a port number of the VLAN forwarder, a system identifier of an ED (i.e. device) located by the VLAN forwarder, an allowed VLAN list of the VLAN forwarder, and a root bridge list recorded by the VLAN forwarder.

After receiving the packet carrying the characteristic value of the neighbor VLAN forwarder from each neighbor VLAN forwarder, the first controlling instruction 630 is further to record the feature information of the neighbor VLAN forwarder carried in the packet, before indicating to update the characteristic value of current VLAN forwarder.

When calculating or updating the characteristic value of current VLAN forwarder, the first controlling instruction 630 is further to calculate a local abstract corresponding to current VLAN forwarder, according to the feature information of current VLAN forwarder, calculate a neighbor abstract corresponding to a neighbor VLAN forwarder, according to the recorded feature information of each neighbor VLAN forwarder, and calculate the characteristic value of current VLAN forwarder, according to the local abstract corresponding to current VLAN forwarder and the neighbor abstract corresponding to each neighbor VLAN forwarder.

When calculating the local abstract, the first controlling instruction 630 is further to employ a predetermined abstract algorithm to perform a calculation based on the port number of current VLAN forwarder, the system identifier of the ED located by current VLAN forwarder, the allowed VLAN list of current VLAN forwarder, and the root bridge list recorded by current VLAN forwarder, and take a result of the calculation as the local abstract corresponding to current VLAN forwarder.

When calculating the neighbor abstract, the first controlling instruction 630 is further to employ a predetermined abstract calculation algorithm to perform a calculation based on the port number of the neighbor VLAN forwarder, the system identifier of the ED located by the neighbor VLAN forwarder, the allowed VLAN list of the neighbor VLAN forwarder, and the root bridge list recorded by the neighbor VLAN forwarder, and take a result of the calculation as the neighbor abstract corresponding to the neighbor VLAN forwarder.

The foregoing predetermined abstract calculation algorithm is MD5 algorithm. When calculating the characteristic value of current VLAN forwarder according to the local abstract corresponding to current VLAN forwarder and the neighbor abstract corresponding to each neighbor VLAN forwarder, the first controlling instruction 630 is further to perform a summing operation on the local abstract and the neighbor abstract, and take a result of the summing operation as the characteristic value of current VLAN forwarder.

Under the circumstances that the above device is elected as the VLAN allocator, when executing transmitting instruction 650, so as to inform a VLAN forwarder about information of a VLAN allocated for each VLAN forwarder, the second controlling instruction 640 is further to inform the VLAN forwarder about the characteristic value of current VLAN forwarder.

Under the circumstances that the above device is the VLAN forwarder, when receiving the information of the VLAN allocated for the VLAN forwarder from the VLAN allocator, the receiving instruction 620 is further to receive the characteristic value informed by the VLAN allocator.

Before allowing the traffic of all of the VLANs allocated for the VLAN forwarder, the first controlling instruction 630 is further to determine, whether the characteristic value received from the VLAN allocator according to receiving instruction 620 is the same as the characteristic value of the VLAN forwarder. When the characteristic value received according to receiving instruction 620 is the same as the characteristic value of the VLAN forwarder, the first controlling instruction 630 is to allow the traffic of all of the VLANs allocated for the VLAN forwarder. When the characteristic value received according to receiving instruction 620 is different from the characteristic value of current VLAN forwarder, the first controlling instruction 630 is to continuously block the traffic of all of the VLANs to access or leave the AN via the VLAN forwarder.

Alternatively or additionally, the example network device 500 in FIG. 5 may be capable of acting as a VLAN forwarder. In one example, the processor 510 is to:

receive a packet carrying a characteristic value of the VLAN forwarder, wherein the VLAN forwarder is allocated to a first VLAN and traffic for the first VLAN is forwarded to and from the AN via the VLAN forwarder;

perform VLAN reallocation if the characteristic value of the VLAN forwarder is the same as a characteristic value of each neighbor VLAN forwarder; and send information that the VLAN forwarder is reallocated to a second VLAN to the VLAN forwarder.

The methods, processes and functional units described herein may be implemented by hardware (including hardware logic circuitry), software or firmware or a combination thereof. The term 'processor' is to be interpreted broadly to include a processing unit, ASIC, logic unit, or programmable gate array etc. The processes, methods and functional units may all be performed by the one or more processors 510; reference in this disclosure or the claims to a 'processor' should thus be interpreted to mean 'one or more processors'.

Although one network interface device 540 is shown in FIG. 5, processes performed by the network interface device 540 may be split among multiple network interface devices (not shown for simplicity). As such, reference in this disclosure to a 'network interface device' should be interpreted to mean 'one or more network interface devices".

Further, the processes, methods and functional units described in this disclosure may be implemented in the form of a computer software product. The computer software product is stored in a storage medium and comprises a plurality of instructions for making a processor to implement the methods recited in the examples of the present disclosure.

The figures are only illustrations of an example, wherein the units or procedure shown in the figures are not necessarily essential for implementing the present disclosure. Those skilled in the art will understand that the units in the device in the example can be arranged in the device in the examples as described, or can be alternatively located in one or more devices different from that in the examples. The units in the examples described can be combined into one module or further divided into a plurality of sub-units.

Although the flowcharts described show a specific order of execution, the order of execution may differ from that which is depicted. For example, the order of execution of two or more blocks may be changed relative to the order shown. Also, two or more blocks shown in succession may be executed concurrently or with partial concurrence. All such variations are within the scope of the present disclosure.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. A method for rapid convergence of an Access Network (AN), wherein a VLAN forwarder is allocated to a first Virtual Local Area Network (VLAN) and traffic for the first VLAN is forwarded to and from the AN via the VLAN forwarder, the method comprising the VLAN forwarder:
when detecting that the VLAN forwarder satisfies a VLAN reallocation condition:
blocking traffic of the first VLAN to and from the AN via the VLAN forwarder,
calculating a characteristic value of the VLAN forwarder, and
transmitting a packet carrying the characteristic value of the VLAN forwarder to each neighbor VLAN forwarder such that VLAN reallocation is performed by a VLAN allocator if the characteristic value of the VLAN forwarder is the same as that of each neighbor VLAN forwarder; and
after receiving information that the VLAN forwarder is reallocated to a second VLAN, allowing the traffic of the second VLAN to and from the AN via the VLAN forwarder.

2. The method according to claim 1, further comprising:
receiving a characteristic value of a neighbor VLAN forwarder,
updating, by the VLAN forwarder, the characteristic value of the VLAN forwarder;
if the updated characteristic value of the VLAN forwarder is different from the characteristic value of the neighbor VLAN forwarder, blocking, by the VLAN forwarder, the traffic of the second VLAN to and from the AN via the VLAN forwarder.

3. The method according to claim 2, wherein detecting by the VLAN forwarder whether the VLAN forwarder satisfies the VLAN reallocation condition comprises:
when a VLAN configuration of the VLAN forwarder changes, determining that the VLAN forwarder satisfies the VLAN reallocation condition;
or, after receiving by the VLAN forwarder a Spanning Tree Protocol (STP) packet from the AN carrying a root bridge list that is not consistent with another root bridge list recorded by the VLAN forwarder, determining that the VLAN forwarder satisfies the VLAN reallocation condition according to the recorded root bridge list which is updated based on the STP packet.

4. The method according to claim 3, wherein the AN is a Transparent Interconnection of Lots of Links (TRILL) access network, which accesses a TRILL network via multiple multi-homing Routing Bridges (RBs);
the VLAN forwarder is any port of all ports accessing the AN in the multiple RBs, each port accessing the AN in the multiple RBs is a neighbor VLAN forwarder; and
the VLAN allocator is a main port elected as a Designated RB (DRB) from all ports accessing the AN, wherein the DRB is elected from the multiple RBs.

5. The method according to claim 3, wherein the AN is an Ethernet Virtual Interconnect (EVI) site network, which accesses a public network via multiple multi-homing Edge Devices (EDs);
the VLAN forwarder is any ED of the multiple EDs, and the multiple EDs are neighbor VLAN forwarders; and
the VLAN allocator is a Designated ED (DED) elected from the multiple EDs.

6. The method according to claim 3, wherein the packet carrying characteristic value of the VLAN forwarder further comprises feature information of a VLAN forwarder transmitting the packet, and the feature information of the VLAN forwarder comprises:
a port number of the VLAN forwarder, a system identifier of a device located by the VLAN forwarder, an allowed VLAN list of the VLAN forwarder, and a root bridge list recorded by the VLAN forwarder;
after receiving a packet carrying the characteristic value of a neighbor VLAN forwarder transmitted by each neighbor VLAN forwarder, recording, by the VLAN forwarder, the feature information of the neighbor VLAN forwarder carried in the packet, before updating the characteristic value of the VLAN forwarder;
wherein calculating or updating the characteristic value of the VLAN forwarder comprises:
calculating a local abstract corresponding to the VLAN forwarder according to the feature information of the VLAN forwarder;
calculating a neighbor abstract corresponding to the neighbor VLAN forwarder according to the recorded feature information of each neighbor VLAN forwarder; and
calculating the characteristic value of the VLAN forwarder according to the local abstract corresponding to the VLAN forwarder and the neighbor abstract corresponding to each neighbor VLAN forwarder.

7. The method according to claim 6, wherein:
calculating the local abstract comprises employing a predetermined abstract calculation algorithm to perform a calculation based on the port number of the VLAN forwarder, the system identifier of the device located by the VLAN forwarder, the allowed VLAN list of the VLAN forwarder, and the root bridge list recorded by the VLAN forwarder, and taking a result of the calculation as the local abstract corresponding to the VLAN forwarder;
calculating the neighbor abstract comprises employing a predetermined abstract calculation algorithm to perform a calculation based on a port number of the neighbor VLAN forwarder, a system identifier of a device located by the neighbor VLAN forwarder, an allowed VLAN list of the neighbor VLAN forwarder, and a root bridge list recorded by the neighbor VLAN forwarder, and taking a result of the calculation as the neighbor abstract corresponding to the neighbor VLAN forwarder.

8. The method according to claim 7, wherein the predetermined abstract calculation algorithm is MD5 algorithm; and
the characteristic value of the VLAN forwarder is calculated by performing a summing operation on the local abstract corresponding to the VLAN forwarder and the neighbor abstract corresponding to each neighbor VLAN forwarder, and taking a result of the summing operation as the characteristic value of the VLAN forwarder.

9. The method according to any of claim 1, before allowing the traffic of the second VLAN to and from the AN, the method further comprises:
determining, by the VLAN forwarder, whether a characteristic value of the VLAN allocator is the same as the characteristic value of the VLAN forwarder;
if the characteristic value of the VLAN allocator is the same as the characteristic value of the VLAN forwarder, allowing the traffic of the second VLAN to and from the AN via the VLAN forwarder;
otherwise, continuing to block the traffic of the second VLAN to and from the AN via the VLAN forwarder.

10. A method for rapid convergence of an Access Network (AN), wherein a VLAN allocator and a VLAN forwarder are neighbor VLAN forwarders, the VLAN forwarder is allocated to a first Virtual Local Area Network (VLAN) and traffic for the first VLAN is forwarded to and from the AN via the VLAN forwarder, and the method comprises the VLAN allocator:
receiving a packet carrying a characteristic value of the VLAN forwarder;
performing VLAN reallocation if the characteristic value of the VLAN forwarder is the same as a characteristic value of each neighbor VLAN forwarder; and
sending information that the VLAN forwarder is reallocated to a second VLAN to the VLAN forwarder.

11. A device for rapid convergence device of an Access Network (AN), wherein the device is capable of acting as a VLAN forwarder that is allocated to a first Virtual Local Area Network (VLAN) to forward traffic of the first VLAN to and from the AN and comprises a processor to:
when detecting that the VLAN forwarder satisfies a VLAN reallocation condition:
block traffic of the first VLAN to and from the AN via the VLAN forwarder,
calculate a characteristic value of the VLAN forwarder, and
transmit a packet carrying the characteristic value of the VLAN forwarder to each neighbor VLAN forwarder such that VLAN reallocation is performed by a VLAN allocator if the characteristic value of the VLAN forwarder is the same as that of each neighbor VLAN forwarder; and
after receiving information that the VLAN forwarder is reallocated to a second VLAN, allow the traffic of the second VLAN to and from the AN via the VLAN forwarder.

12. The device according to claim 11, wherein the device is capable of acting as a VLAN allocator and the processor is further to:
when receiving a packet carrying a characteristic value of a neighbor VLAN forwarder, record the characteristic value of the neighbor VLAN forwarder;
calculate a characteristic value of the VLAN allocator;
when the characteristic value of the VLAN allocator is the same as the recorded characteristic value, reallocate each VLAN forwarder to the second VLAN, and
send, to each VLAN forwarder, information of the second VLAN.

13. The device according to claim 12, wherein:
the packet carrying characteristic value of the VLAN forwarder further comprises feature information of the VLAN forwarder transmitting the packet, and the feature information of the VLAN forwarder comprises: a port number of the VLAN forwarder, a system identifier of a device located by the VLAN forwarder, an allowed VLAN list of the VLAN forwarder, and a root bridge list recorded by the VLAN forwarder; and
the processor is to calculate the characteristic value of the VLAN forwarder by:
calculating a local abstract corresponding to the VLAN forwarder according to the feature information of the VLAN forwarder;
calculating a neighbor abstract corresponding to a neighbor VLAN forwarder according to recorded feature information of each neighbor VLAN forwarder; and
calculating the characteristic value of the VLAN forwarder according to the local abstract corresponding to the VLAN forwarder and the neighbor abstract corresponding to each neighbor VLAN forwarder.

14. The device according to claim 13, wherein:
the processor is to calculate the local abstract using a predetermined abstract calculation algorithm to perform a calculation based on the port number of the VLAN forwarder, the system identifier of the device located by the VLAN forwarder, the allowed VLAN list of the VLAN forwarder, and the root bridge list recorded by the VLAN forwarder, and taking a result of the calculation as the local abstract corresponding to the VLAN forwarder; and
the processor is to calculate the neighbor abstract using a predetermined abstract calculation algorithm to perform a calculation based on a port number of the neighbor VLAN forwarder, a system identifier of a device located by the neighbor VLAN forwarder, an allowed VLAN list of the neighbor VLAN forwarder, and a root bridge list recorded by the neighbor VLAN forwarder, and taking a result of the calculation as the neighbor abstract corresponding to the neighbor VLAN forwarder.

15. The device according to claim 14, wherein the predetermined abstract calculation algorithm is MD5 algorithm; and
the processor is to calculate the characteristic value of the VLAN forwarder by performing a summing operation on the local abstract and the neighbor abstract and taking a result of the summing operation as the characteristic value of the VLAN forwarder.

* * * * *